United States Patent
Pribonic et al.

[11] Patent Number: 5,093,176
[45] Date of Patent: Mar. 3, 1992

[54] COMPOSITE COOKING DEVICE

[75] Inventors: David K. Pribonic, Jacksonville; Russell B. Gordon, Sr., Atlantic Beach, both of Fla.

[73] Assignee: Absorbent Technologies, Inc., Jacksonville, Fla.

[21] Appl. No.: 156,402

[22] Filed: Feb. 16, 1988

[51] Int. Cl.$^5$ .................................................. B32B 1/04
[52] U.S. Cl. .................................... 428/76; 206/204; 426/106; 426/124; 426/129; 428/68; 428/77; 428/121; 428/192; 428/284; 428/287; 428/297; 428/298; 428/903; 428/913
[58] Field of Search ............... 428/284, 286, 287, 913, 428/121, 248, 249, 252, 903, 297, 298, 192, 68, 76, 77; 604/370, 374, 375, 367, 106; 206/204; 426/129, 124, 107, 234

[56] References Cited
U.S. PATENT DOCUMENTS

| | | | |
|---|---|---|---|
| 3,987,792 | 10/1976 | Hernendez et al. | 604/370 |
| 4,413,995 | 11/1983 | Korpman | 428/287 |
| 4,716,061 | 12/1987 | Winter | 426/107 |
| 4,720,410 | 1/1988 | Lundquist et al. | 428/136 |
| 4,786,513 | 11/1988 | Monforton et al. | 426/234 |
| 4,923,725 | 5/1990 | Zafiroglu | 422/903 |
| 4,935,276 | 6/1990 | Pawlowski et al. | 428/35.7 |
| 4,935,282 | 6/1990 | Paulowski et al. | 428/121 |

Primary Examiner—James J. Bell
Attorney, Agent, or Firm—Arthur G. Yeager

[57] ABSTRACT

A composite cooking device particularly suitable for cooking bacon in a microwave oven comprising two multi-layered absorbent pads in a foldable carrier which will absorb the greasy by-product of cooking bacon or similar food while sandwiched between the two pads; each pad made of oil-absorbent and water-absorbent materials with an oil-impervious and water-impervious barrier film around the outside of the pads.

22 Claims, 3 Drawing Sheets

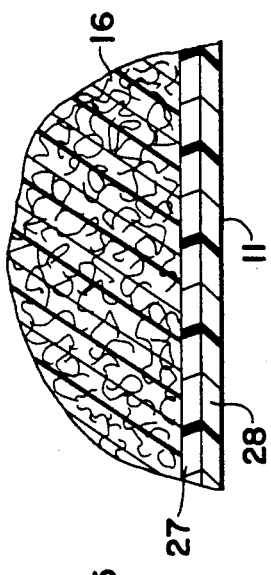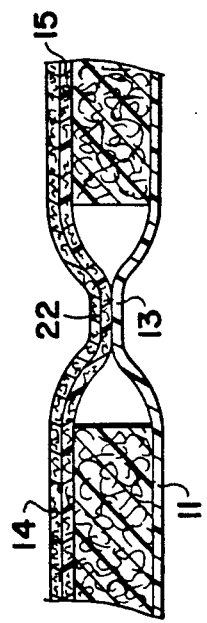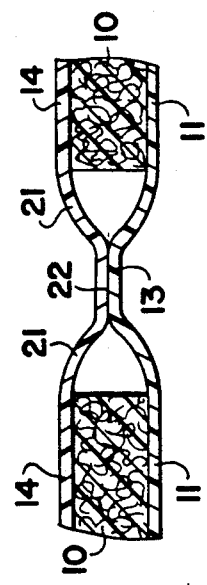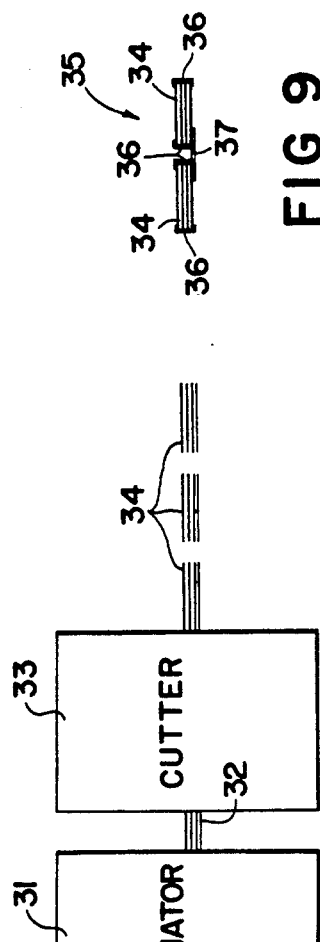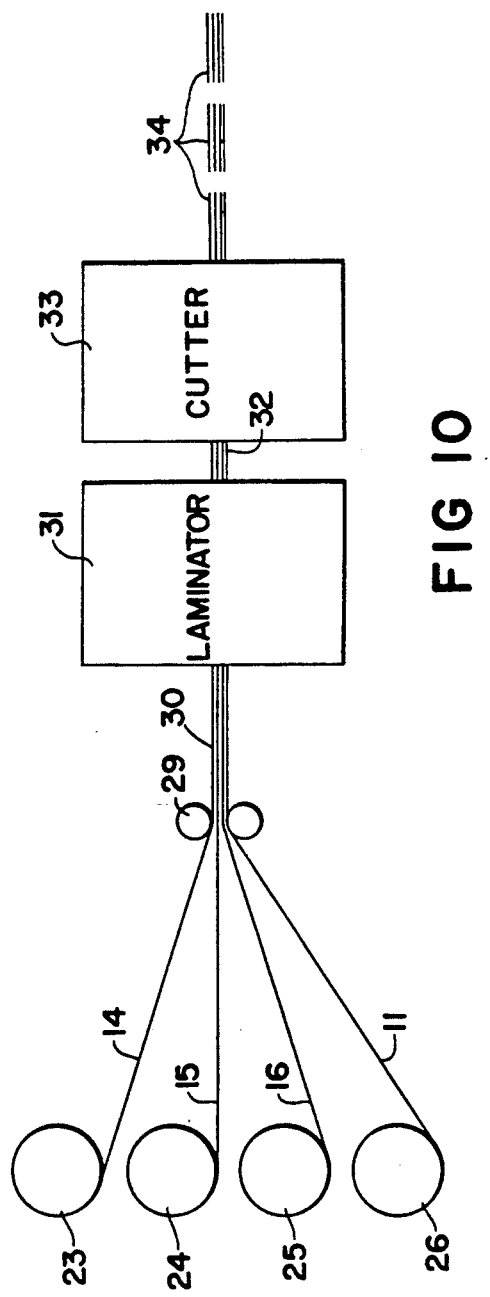
FIG 6
FIG 7
FIG 8
FIG 9
FIG 10

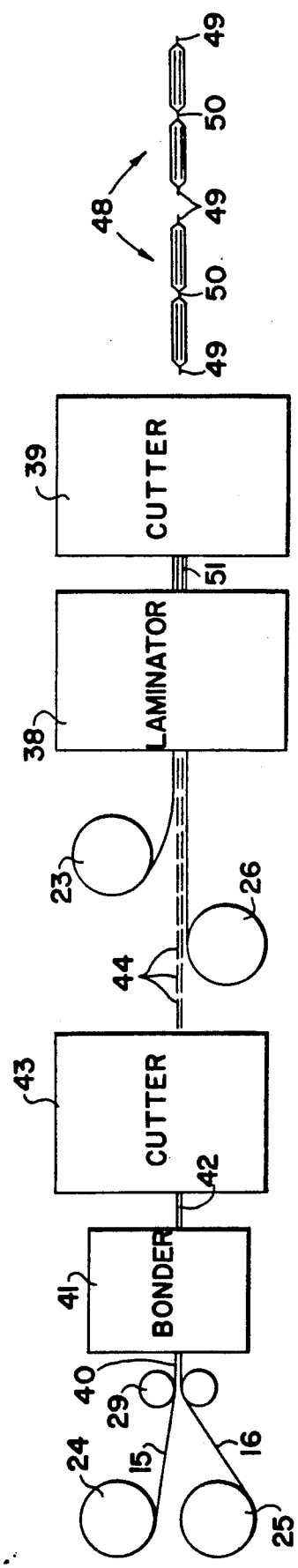
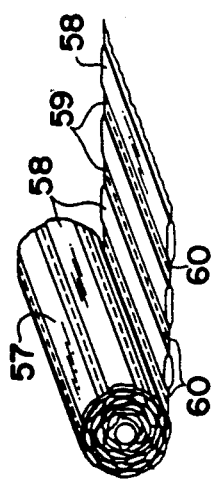
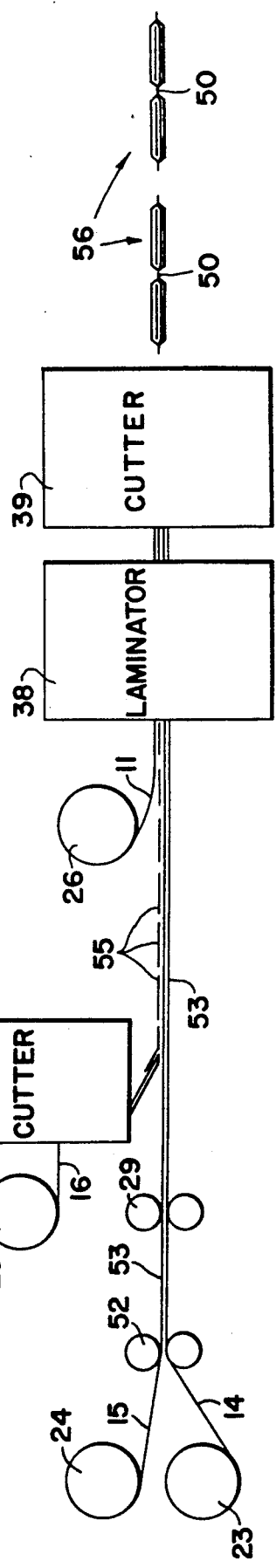

COMPOSITE COOKING DEVICE

BACKGROUND OF THE INVENTION

Conventional cooking in a microwave oven of greasy foods, such as bacon and sausage, presents a problem in the collection and disposal of the grease which is expelled during the cooking process. In addition, some of the expelled grease remains on the surface of the food product, adding to the amounts of sodium and cholesterol in the cooked food. Recent medical evidence warns of the potential health hazards associated with excess sodium, fat, and cholesterol in the diet.

One method for the cooking of greasy food products in a microwave oven is to first place several layers of paper towels or the like in the bottom of the microwave oven or on a plate. The food product, bacon for example, is then placed on top of the paper towels with another layer of paper towels placed on top of the food product to prevent splattering. During the cooking process, the paper towels underneath the food product quickly become saturated with the expelled grease and water, normally resulting in residual grease left in the bottom of the microwave oven, which must be cleaned out at some point. Likewise, the two to three layers of paper towels above the food product quickly become saturated with the grease and water splattering up from the food, leaving any excess grease to pool on the surface of the food. This requires additional blotting of the food product with more paper towels once it is removed from the microwave oven.

Another method of cooking greasy food products in a microwave oven is to place the food on a microwave bacon tray and covering the top surface of the food with several layers of paper towels as was mentioned above. These types of cooking trays have raised grooves to allow the expelled grease to collect in the bottom of the tray. As the grease collects in the bottom of the tray during cooking, additional splattering occurs, adding to the grease remaining on the underneath surface of the food following cooking. In order to remove the additional surface grease, more blotting is required with paper towels after the food has been removed from the microwave oven. Moreover, one now has to deal with the messy problem of disposing of the grease left in the bottom of the cooking tray, as well as the cleaning of the tray. This is an inconvenience most people would rather avoid. Accordingly, there has been a need for an improved procedure for cooking bacon and sausage in a microwave oven.

It is an object of this invention to provide an improved cooking assistant for use in cooking bacon or sausage in a microwave oven. Another object is to provide a disposable grease collecting device. Still other objects will become apparent from the more detailed description which follows.

BRIEF SUMMARY OF THE INVENTION

This invention relates to an absorbent pad for microwave cooking of oily foods comprising a laminate of a top layer of absorbent cellulosic material, a second layer of a fabric of rayon or polyester, a third layer of fluffy fibrous oleophilic polyester or polyolefin, such as polypropylene or polyethylene, and a bottom layer of a plastic film barrier impervious to water and to oil with its outer edge extending beyond the edges of said second and third layers, and being bonded to said top layer along its edge thereof. In a particularly desirable embodiment the invention relates to a composite microwave cooking device primarily for cooking oily foods comprising a multilayered planar pad of absorbent material having an upper surface and a lower surface, and a backing sheet of water- and oil-impervious material extending over said entire lower surface of said pad; said backing sheet being bonded to said upper surface along its edges thereof to retain any oil within said pad, a barrier sheet between said pad and said backing sheet to inhibit oil from contacting said backing sheet.

The invention also relates to a process for preparing a composite microwave cooking device which comprises the steps of:

a) melt blowing a polyester or a polyolefin onto a sheet of rayon or polyester fabric having a weight of about 20–80 grams per square meter to produce a composite sheet having about 50–600 grams per square meter of fluffy, fibrous polyester or polyplefin attached to the sheet of rayon or polyester;

b) laminating to one side of the composite sheet a layer of absorbent cellulosic material having a weight of about 48–155 grams per square meter;

c) laminating to the other side of the composite sheet a heat sealable, water- and oil-impervious plastic film;

d) cutting the resulting laminate into two identical substantially planar pads, each having at least one edge;

e) positioning the two pads with the edges being adjacently spaced from each other; and f) joining the two pads by a strip of plastic film along the adjacent edges of the pads to form an article which is foldable along the strip to permit the cellulosic material of the two pads to be substantially in contact.

An alternate embodiment of this invention is a process for preparing a composite microwave cooking device which comprises:

a) preparing a binary sheet by pressing two spaced sheets of rayon or polyester having a weight of about 20–80 grams per square meter onto a single continuous elongated sheet absorbent paper having a weight of about 48–155 grams per square meter; the sheet of paper extending outwardly beyond the spaced sheets to form a pair of spaced edges;

b) preparing two oil-absorbing sheets of melt blown polyester or polyolefin having a weight of about 50–600 grams per square meter, each oil-absorbing sheet being substantially identical in size to the two spaced sheets of rayon or polyester;

c) positioning on a surface of a continuous elongated sheet of heat sealable, water- and oil-impervious plastic film, substantially identical in size to the elongated sheet of absorbent paper, the two oil-absorbing sheets spaced apart to substantially coincide with the two spaced sheets of rayon or polyester on the sheet of absorbent paper so as to form a pair of spaced edges of the plastic film;

d) locating the two elongated sheets together to dispose the oil absorbing spaced sheets in contact with the spaced sheets of rayon or polyester with the edges of absorbent paper facing respective aligned edges of the plastic film;

e) laminating all of the sheets together to form an article of two spaced pads of all the sheets of rayon or polyester contiguous with the sheets of melt blown polypropylene or polyester with the sheet of absorbent paper on top of the article and the sheet of plastic film on the bottom of the article, and with the edges of absorbent paper and plastic film heat sealed to each other.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 6 is a partial front elevational view showing one type of construction of the connecting hinge strip;

FIG. 7 is a partial front elevational view showing a second type of construction of the connecting hinge strip;

FIG. 8 is a partial enlarged view of the backing layer shown in FIG. 2;

FIG. 9 is a schematic illustration of a product made by the process of FIG. 10;

FIG. 10 is a schematic illustration of one method of manufacture of the cooking device of this invention; and FIG. 11 is a schematic illustration of a second method of manufacture of the cooking device of this invention;

FIG. 12 is a schematic illustration of a third method of manufacture of the cooking device of this invention;

FIG. 13 is a schematic illustration of the cooking devices of this invention in a continuous roll of tear-off strips.

DETAILED DESCRIPTION OF THE INVENTION

The features of this invention may best be understood by reference to the attached drawings.

Figure 1:
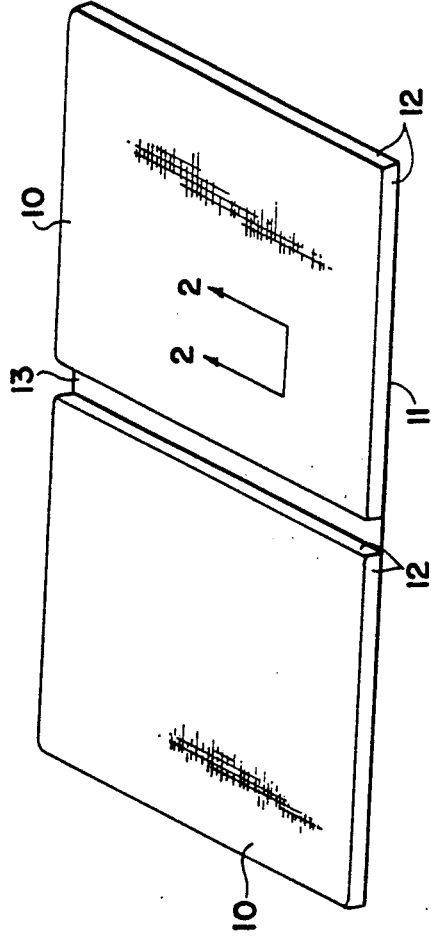
FIG. 1 is a perspective view of the composite cooking device of this invention.

In FIG. 1 there is shown a general illustration of this invention which is particularily useful in cooking bacon, sausage, or other grease-producing food in a microwave oven. The invention involves two grease-absorbent pads 10 which can be closed upon each other like a book with slices of bacon or pieces of sausage between the two closed pads 10. A backing sheet 11, which is a barrier to the passage of oil, grease, water, etc. covers the bottom side and all the edges of the pads 10. Backing sheet 11 extends underneath both pads 10, which are spaced apart along their inner edges to leave a hinge strip 13 which acts like the bindings of a book to permit the pads 10 to be folded onto each other. Edge flaps 12 of backing sheet 11 are folded upwardly and sealed in place so as to make all edges leak-proof to contain any and all grease, oil, and water expelled from the cooked food.

Figure 2:
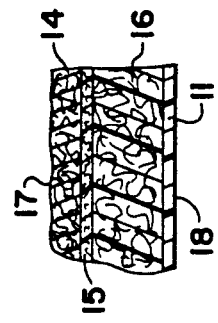
FIG. 2 is a cross sectional view taken at 2—2 of FIG. 1.

In FIG. 2 there is shown the preferred components of the absorbent pad device of this invention. Upper layer 14 is an absorbent cellulosic material such as paper, wood fiber, wood pulp, etc. A preferred material is an air laid wood fiber pulp, having a bulk density of about 40–130 grams per square yard (48–155 grams per square meter). Layer 14 serves to absorb any water and to permit grease or oil to pass through to a lower layer. This upper layer could also include a corrugated cardboard material pierced with holes. The corrugation supplies a stiffness for convenient handling of pad 10, and the pierced holes permit the melted grease, oil, or water to pass through to an interior absorbent layer.

Intermediate layer 15 is a sheet of woven or nonwoven low denier rayon or polyester. This sheet is porous but it impedes the flow of hot grease until it cools enough to cause no damage to the next lower layer; and it also retains moisture to keep the cooked food from becoming too dry. This layer 15 has a bulk density of about 20–80 grams per square meter.

Layer 16 is a fluffy, oil-absorbent, fibrous, nonwoven polyamide, polycarbonate, polyester, or polyolefin, such as polyethylene, polypropylene, other polyalkylenes, or polyarylenes, as disclosed in U.S. Pat. No. 3,764,527. Preferably this layer is formed by a melt blowing technique with intermediate layer 15 functioning as the support upon which layer 16 is formed. Layer 16 has a bulk density of about 50–600 grams per square meter, preferably about 50–400 grams per square meter. The function of this layer is to absorb the melted grease or oil. If desired, this layer can be treated with a surfactant to make it also water-absorbent. A typical surfactant is a Triton (made and sold by Rohm and Haas) which is an alkyphenyl ether of polyethylene glycol.

Bottom layer 11 is the backing sheet described in general above. This layer serves as a barrier and will not permit the passage of grease, oil, or water. In this way, this cooking device prevents any escape of grease or oil and eliminates any need to clean out the oven after cooking. Layer 11 must also be bondable to the other layers, principally upper layer 14 and fluffy layer 16 by heat sealing. For this reason, it is preferred that layer 11 be made of two materials as shown in FIG. 8. A layer of ethylene/vinyl acetate copolymer (E/VA) 27 lies next to the fluffy absorbent layer 16, and a layer of polyester 28 faces outwardly. E/VA copolymer layer 27 has good barrier properties and also can be readily heat sealed to the fluffy, fibrous polyester or polyolefin of layer 16 and to the cellulosic material of layer 14. The polyester, e.g. polyethylene terephthalate layer 28 is an excellent barrier to the melted grease or oil in layer 16, is a clear glossy material with a good handle, and thus is an excellent outer layer for the final product. Preferably layer 11 is 2–7 mils thick, desirably about 5 mils, and is prepared by extruding an ethylene/ vinyl acetate copolymer onto a film of polyester to make a single film of two materials.

Figure 4:
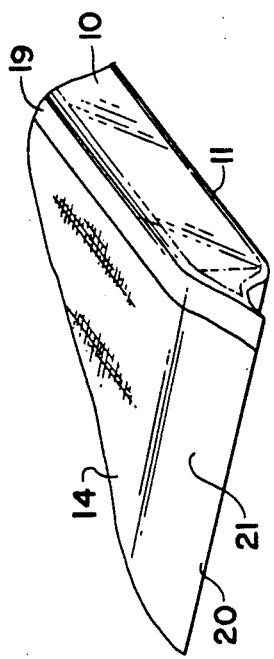
FIG. 4 is a partial perspective view of a corner of a pad of this invention showing a second type of edge construction.
Figure 5:
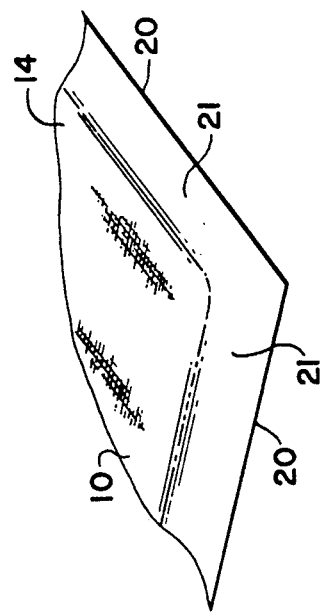
FIG. 5 is a partial perspective view of a corner of a pad of this invention showing a third type of edge construction.
Figure 3:
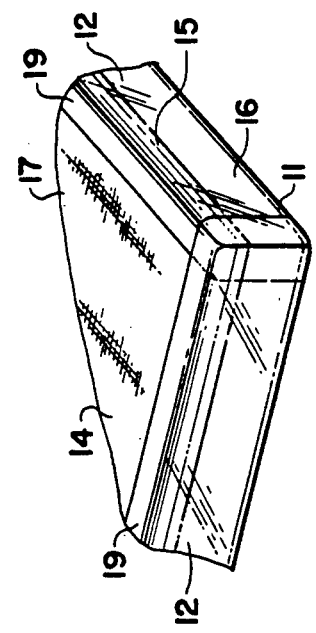
FIG. 3 is a partial perspective view of a corner of a pad of this invention showing one type of edge construction.

In FIGS. 3–7 there are shown alternative arrangements for sealing the edges of pads 10 and preparing a folding area between two adjacent pads 10. In FIG. 3 backing sheet 11 is made to extend outwardly beyond the edges of pad 10 as edge flaps 12 which are then folded upwardly and heat sealed at 19 to the top layer 14 and also to the edges of layers 15 and 16. In FIG. 4 one edge is covered with a heat sealed edge flap at 19 while adjoining edges are sealed at 20 by laminating an extension 21 of layer 14 to an extension of layer 11. In FIG. 5 all free edges are sealed as shown at 20 by laminating paper layer 14 extension 21 to an extension of backing sheet 11. In FIG. 1 there is shown a foldable hinge strip 13 formed by making backing layer 11 of both pads 10 into one continuous layer to include strip 13. In FIG. 6 hinge strip 13 includes upper layer 14 of both pads 10 as a continuous sheet including extensions 21, sealed to bottom layer at 22. In FIG. 7 there is an alternate construction in which hinge strip 13 includes continuous upper layer 14, continuous layer 15, and continuous backing sheet 11 all laminated together at 22. It should be noted that instead of having layers 14 and 11 continuous through both pads 10, it is entirely feasible to seal the edges of pads 10 by applying separate strips of layer 11 and heat sealing them in place, as well as employing a separate strip of layer 11 to function as the folding strip 13.

In FIGS. 9-12 there are shown procedures for preparing the cooking pad device of this invention. In FIG. 10 there are feed rolls of the four materials used in the device. Roll 23 contains the absorbent cellulosic material of upper layer 14. Roll 24 contains the sheet of rayon or polyester of layer 15. Roll 25 contains the fluffy, nonwoven, oil-absorbent material of layer 16. Roll 26 contains the backing sheet 11 of polyester on the bottom face and ethylene/vinyl acetate copolymer on the upper face. Materials from all four rolls are fed simultaneously through pressure drive rolls 29 to form a four-component sheet which enters laminator 31. The product 32 from laminator 31 is heat sealed and pressed together to form a unitary sheet which is then cut in cutter 33 into individual pads 34. Two pads 34 are then taped around all four edges 36 with strips of backing sheet 11 and the two edge-sealed pads 34 are joined by a fold strip 37 to make the final product 35 as shown in FIG. 9.

In FIG. 11 a roll 24 of layer 15 and a roll 25 of layer 16 are fed through pressure drive rolls 29 to make a two layered sheet 40 which is adhered together by physical means, e.g. by stitching or chemical means, e.g. by adhesive bonding in bonder 41 to make a two layer sheet 42 that is cut in cutter 43 into individual pad portions 44. Spaced pad portions 44 are fed between continuous sheets of cellulosic layer 11 from roll 23 and backing sheet 11 from roll 26 into laminator 38 to make a four layer sheet 51 which is cut by cutter 39 into final product 48. Product 48 is similar to the articles shown in FIGS. 4 or 5 with edges of upper layer 14 and lower layer 11 heat sealed as at 49 along with a central fold area 50.

In FIG. 12 there is shown a modified process in which roll 24 and roll 23 feed sheets of layers 15 and 14 into calendar rolls 52 which press these two layers together to make a single two-layer sheet 53 which passes through pressure drive rolls 29. Roll 25 feeds a sheet of layer 16 into cutter 54 to produce a series of spaced pads 55 of layer 16 that are dropped onto two-layer sheet 53. A continuous sheet of backing sheet 11 is fed from roll 26 onto the top of pads 55, and the entire four-layer composite is fed into laminator 38 and then into cutter 39. The resulting products 56 are quite similar to products 48 (FIG. 11) except that two-layer sheet 53 extends through central fold area 50 and sealed edges 49 as well as backing sheet 11.

The cooking device of this invention may be any size of product depending on the application intended. If an entire pound of bacon or a large number of sausages are to be cooked at one time each pad 10 may be 9-12 inches square. If one or two slices of bacon or two or four sausage links are to be cooked pad 10 may be 9-12 inches long but only 3-4 inches wide. Other sizes may be needed for other operations. In FIG. 13 there is shown a roll 57 of a plurality of pads 58 having the same general internal construction as that described above with respect to FIGS. 1-8 but not cut into pairs to make individual products such as 35, 48, and 56 of FIGS. 9-12. Here individual pads 58 are separated by fold areas 59 through which a perforated line 60 is punched. Thus any number of pads 58 may be employed and separated as desired from roll 57 for use by tearing along a selected line 60.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what is desired to secure by Letters Patent of the United States is:

1. A composite microwave cooking device primarily for cooking oily foods comprising a multilayered planar pad including an upper layer, an intermediate layer and a lower layer, said upper and lower layers being of absorbent materials, said intermediate layer retarding the flow of hot grease absorbed by said upper layer until sufficiently cooled to be absorbed by said lower layer, a backing sheet of water-and-oil-impervious material extending beneath said lower layer and extending outwardly beyond said lower layer along its outer periphery and being bonded to said upper layer to retain any oil within said pad.

2. The device of claim 1 wherein said lower layer is a fluffy, nonwoven, fibrous layer of oil-absorbent polyolefin, polyamide, polycarbonate, or polyester.

3. The device of claim 2 wherein said fluffy, nonwoven, fibrous layer is a melt-blown material.

4. The device of claim 1 wherein said upper layer is of absorbent cellulosic material, said intermediate layer being of absorbent rayon or polyester material, and said lower layer being of oil-absorbent fluffy, nonwoven, fibrous polyolefin or polyester.

5. The device of claim 2 wherein said polyolefin is polyethylene or polypropylene.

6. The device of claim 1 wherein said material of said backing sheet is a plastic film.

7. The device of claim 6 wherein said film includes a layer of polyester forming a barrier sheet facing outwardly and a layer of a copolymer of ethylene and vinyl acetate facing inwardly and contacting said lower layer.

8. The device of claim 1 wherein said backing sheet is a film of polyester with a layer of copolymer of ethylene and vinyl acetate extruded onto one surface thereof and contacting said lower layer.

9. The device of claim 11 wherein said backing sheet is bonded to said lower layer.

10. The device of claim 9 wherein said backing sheet extends coextensively with said lower layer and is bonded thereto and bonded to said upper layer along its outer periphery thereof.

11. The device of claim 10 wherein said backing sheet extends above said upper layer and forms a border thereabout.

12. The device of claim 10 wherein said backing sheet extends substantially parallel to and beneath said lower layer and maintains hot grease within the oil absorbent layers of said pad.

13. The device of claim 1 comprising two of said pads spaced apart from each other, flexible means for connecting said pads together along adjacent respective side edges whereby said pads may be folded upon each other to dispose said upper layers thereof in substantial coextensive face-to-face contact.

14. The device of claim 13 wherein said flexible means includes a sheet of water- and oil-impervious material.

15. The device of claim 14 wherein said flexible means and said backing sheet of each of said pads are unitary.

16. An absorbent pad of microwave cooking of oily foods comprising a laminate of a top layer of absorbent cellulosic material, a second layer of a fabric of rayon or polyester, a third layer of melt blown oil-absorbing polyolefin or polyester, and a bottom layer of a plastic film barrier impervious to water and to oil with its outer periphery extending beyond peripheries of said second and third layers, and being bonded to said top layer along its periphery thereof.

17. The pad of claim 16 wherein said top layer is an absorbent, air-laid paper weighing about 48–155 grams per square meter.

18. The pad of claim 16 wherein said second layer is a woven or nonwoven fabric of rayon or polyester weighing about 20–80 grams per square meter.

19. The pad of claim 16 wherein said third layer is a sheet of melt blown polyethylene, polypropylene, or polyester weighing about 50–600 grams per square meter.

20. The pad of claim 16 wherein said bottom layer is a plastic film 3–7 mils thick with one surface being a polyester and the other surface being a copolymer of ethylene and vinyl acetate, said other surface being bonded to said periphery of said top layer.

21. The pad of claim 16 wherein said pad is rectangular and said periphery is defined by four side edges.

22. The pad of claim 16 wherein said bottom layer is folded upwardly over said top layer to form a bonded border therearound and to span across peripheries of said second and third layers to seal same and inhibit water and oil discharged by the oily foods while cooking in the microwave from leaking outwardly of said pad.

* * * * *